United States Patent [19]

Kaveh

[11] Patent Number: 4,601,742
[45] Date of Patent: Jul. 22, 1986

[54] BLOWER FOR MINERAL FIBERIZER

[75] Inventor: Farrokh Kaveh, Dublin, Ohio

[73] Assignee: Owens-Corning Fiberglas Corporation, Toledo, Ohio

[21] Appl. No.: 725,738

[22] Filed: Apr. 22, 1985

[51] Int. Cl.$^4$ .............................................. C03B 37/04
[52] U.S. Cl. .................................................. 65/14; 65/6
[58] Field of Search .......................................... 65/6, 14

[56] References Cited

U.S. PATENT DOCUMENTS

| | | |
|---|---|---|
| 2,981,974 | 5/1961 | Levecque et al. . |
| 3,084,380 | 4/1963 | Levecque et al. ............... 65/14 X |
| 3,250,602 | 5/1966 | Stalego . |
| 3,254,977 | 6/1966 | Levecque et al. . |
| 3,560,179 | 2/1971 | Kleist . |
| 3,787,194 | 1/1974 | Rayle et al. . |
| 3,830,638 | 8/1974 | Jumentier et al. . |
| 4,058,386 | 11/1977 | Faulkner et al. . |
| 4,087,267 | 5/1978 | Goutte et al. . |
| 4,246,017 | 1/1981 | Phillips ........................... 65/8 |
| 4,300,932 | 11/1981 | Phillips et al. ................... 65/14 |
| 4,392,879 | 7/1983 | Takeuchi et al. ................. 65/8 X |
| 4,534,779 | 8/1985 | Herschler ....................... 65/14 X |

*Primary Examiner*—Robert Lindsay
*Attorney, Agent, or Firm*—Ronald C. Hudgens; Greg Dziegielewski; Ted C. Gillespie

[57] ABSTRACT

Apparatus for producing mineral fibers comprises a spinner mounted for rotation to centrifuge mineral fibers from molten mineral material, an annular blower positioned concentrically outwardly from the spinner for turning the mineral fibers downwardly and inducing a downward flow of air around the spinner, and an airfoil mounted above the blower to provide a downwardly converging annular passageway above the blower for the induced air, the blower and the airfoil forming a substantially continuous curved surface, being curved radially inwardly at the blower.

3 Claims, 4 Drawing Figures

BLOWER FOR MINERAL FIBERIZER

TECHNICAL FIELD

This invention relates to apparatus for discharging a flow of gases and in particular blowers for discharging gases suitable for attenuating or directing molten mineral material into mineral fibers. In one of its more specific aspects, this invention relates to apparatus for controling the flow of air induced by an annular blower in a mineral fiberizing process.

BACKGROUND OF THE INVENTION

The common practice in forming fibers of mineral material is to pass the material in a molten state through the orifices of the peripheral wall of a centrifuge or spinner to create primary fibers. Thereafter, the primary fibers are further attenuated into a veil of secondary fibers of smaller diameter by the action of a flow of gases discharged downwardly from an annular blower. It is known that a passageway can be provided over the top of a blower for the introduction of induced air by the blower jet. The induced air flow turns the primary fibers downwardly and brings them into contact with the blower jet. Typically, the blower jet induces four times its own air flow.

One of the problems associated with the blowers of the fiber forming devices of the prior art is that the induced air is typically made to follow the contour of the cap of the blower, which requires the induced air to make sharp changes in direction. This has a destabilizing effect on the flow pattern causing undue fluctuation in the flow field of the induced air. This fluctuation is translated to the fibers, causing them to run into each other and fuse, degrading product quality.

Another problem with conventional annular blowers for mineral fiberizers is that the blowers are somewhat inefficient. Typically, the blower outlet is positioned at the level of the top row of orifices in the spinner, but the fibers do not reach the blower jet until a position well below the spinner is attained. Although the flow of induced air is helpful in turning the fibers downwardly, it causes a delay in the time for the fiber to reach the blower jet. Since the blower jet decays rapidly as it moves downwardly, the full efficiency of the blower jet is not applied to the glass fibers. This problem is made worse by the trend toward finer fibers which have a lower momentum, and for which it is even more difficult to penetrate the induced air flow and reach the influence of the blower jet.

There is a need for a blower which provides for an induced air flow which is more stable and is more easily penetrated by the mineral fibers. Also, there is a need for a blower of greater efficiency which can influence and attenuate mineral fibers closer to the blower outlet.

SUMMARY OF THE INVENTION

According to this invention, there is provided apparatus for producing mineral fibers comprising a spinner mounted for rotation to centrifuge mineral fibers from molten mineral material, an annular blower positioned concentrically outwardly from the spinner for turning the mineral fibers downward and inducing a downward flow of air around the spinner, and an airfoil mounted above the blower to provide a downwardly converging annular passageway above the blower for the induced air, the blower and the airfoil forming a substantially continuous curved surface, being curved radially inwardly at the blower.

In a specific embodiment of the invention, the outlet of the blower is positioned at a level beneath the spinner.

In another specific embodiment of the invention, a second airfoil is mounted beneath the blower to provide a downwardly diverging annular passageway below the spinner.

DESCRIPTION OF THE INVENTION

The invention will be described in terms of a glass fiber forming operation, although it is to be understood that the invention can be practiced using other heat softenable mineral materials such as rock, slag and basalt.

Figure 1:
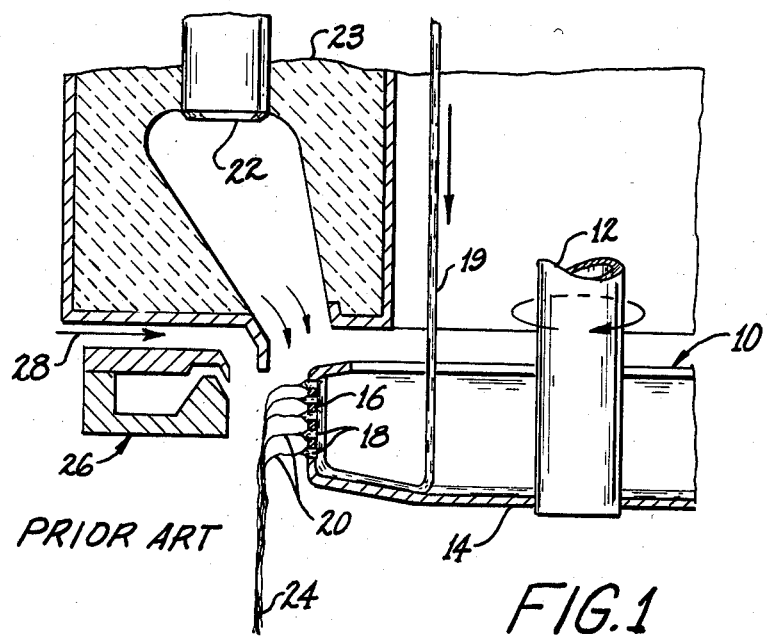
FIG. 1 is a schematic view in elevation of apparatus for attenuating molten mineral material into mineral fibers according to the prior art.

As shown in FIG. 1, spinner 10 is mounted for rotation on quill 12 and can be comprised of spinner bottom wall 14 and peripheral wall 16, which has orifices 18 positioned therein. Molten glass 19 dropping into the spinner impinges on the spinner bottom wall and flows to the spinner peripheral wall. The glass passes through the orifices to form primary fibers 20. The primary fibers can be maintained in a plastic, attenuable condition by the heat supplied from annular burner 22 mounted in refractory casing 23. In some fiberizing processes, the external annular burner is not necessary. The primary fibers can be further attenuated into secondary fibers 24 by the action of high velocity gases discharged from annular blower 26. The action of the blower gases causes a flow of induced air to travel across the top of the blower, as indicated by arrow 28.

Figure 3:
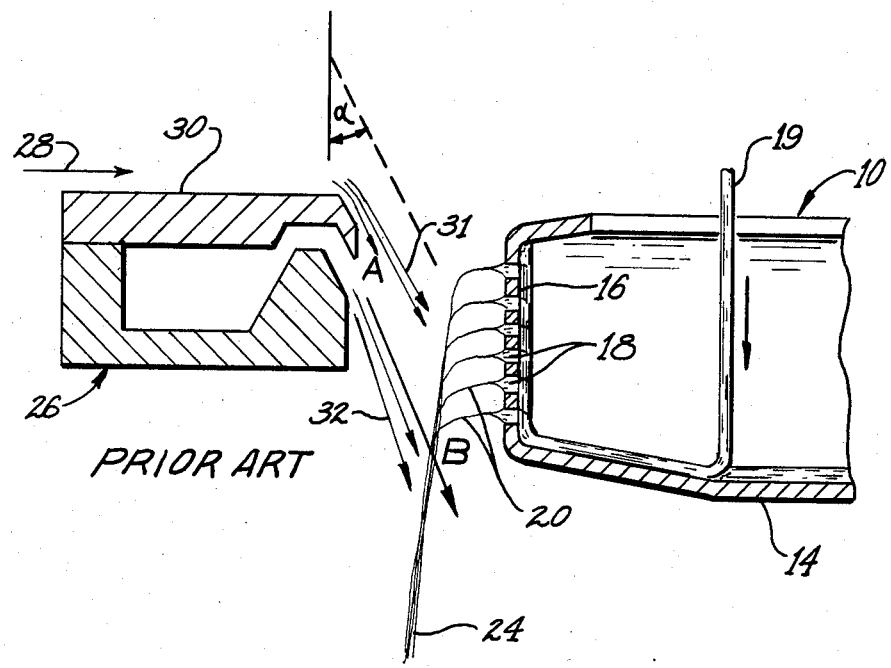
FIG. 3 is a schematic cross-sectional view in elevation of the blower and spinner of the prior art, showing the blower jet and the induced air flow.

As shown in FIG. 3, the angularity of the blower cap 30 causes the induced air flow 31 to change direction sharply, thereby resulting in an uneven or fluctuating movement of air in the induced air flow. Also, the induced air flow has a radially inward component and travels generally at an angle alpha to the vertical. Thus, the induced air flow is somewhat traveling away from the blower. The primary fiber is turned downwardly as soon as it meets the induced air flow, and does not intersect blower jet 32 until locus B, positioned a substantial distance from the blower outlet at locus A. By the time the blower jet reaches locus B, it has decayed significantly, and the efficiency of attenuation is impaired.

Figure 2:
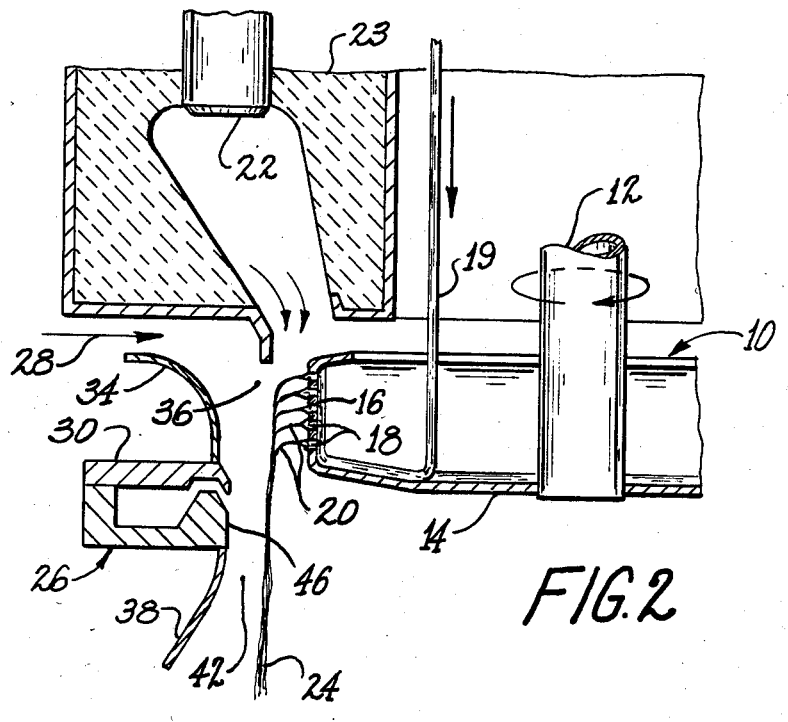
FIG. 2 is a schematic view in elevation of apparatus for attenuating molten mineral material into mineral fibers according to the principles of this invention.
Figure 4:
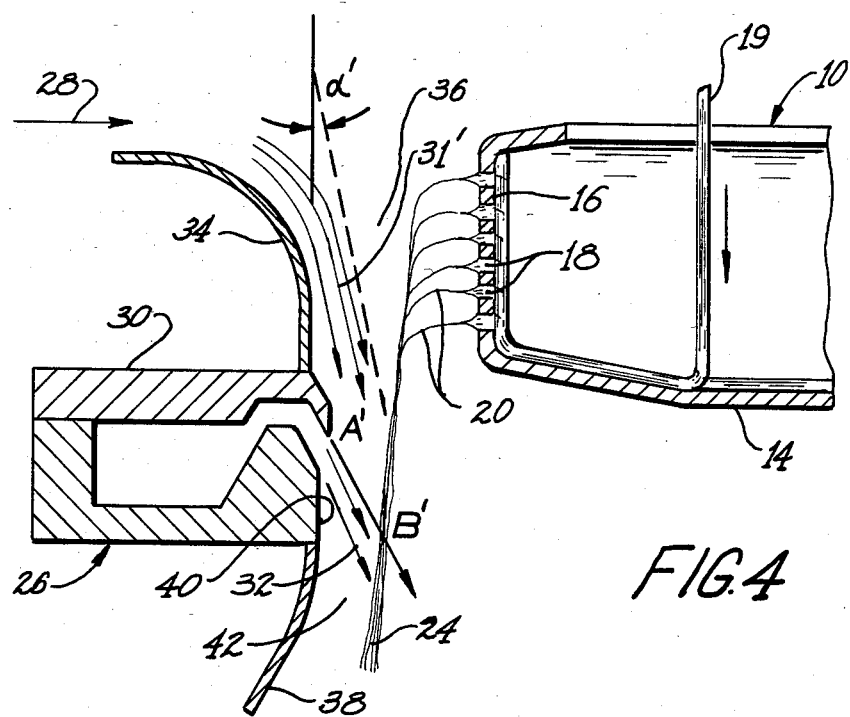
FIG. 4 is a schematic cross-sectional view in elevation of the blower and spinner according to the principles of this invention.

As shown in FIGS. 2 and 4, the induced air flow 31' is stabilized and controlled to pass directly across the face of the blower by the use of an airfoil. The airfoil can be any member, preferably an annular member, for providing a smooth flow of induced air, such as top airfoil 34. The top airfoil defines with the spinner peripheral wall a downwardly converging annular passageway 36 for the flow of induced air. The top airfoil controls the flow of induced air to bring it into a more vertical alignment, being at an angle alpha prime to the vertical which is significantly smaller than the angle alpha of the induced air flow of the prior art fiberizers.

The blower jets 32 in both the invention and in the prior art apparatus are identical. But because the induced air flow 31' closely hugs the continuous curved surface defined by the top airfoil and the blower itself, the primary fibers intersect the blower jet at locus B' which is significantly closer to blower outlet A'. Thus, the distance A'B' is significantly less than the distance AB. The efficiency is increased over that of prior art devices because the glass fiber intersects the blower jet in a region of higher velocity than in the prior art apparatus.

The use of the airfoil of this invention provides an added advantage in that it enables the blower to be positioned at a level beneath the spinner. Heretofore, positioning the blower at a level beneath the spinner would result in the induced air flying right into the spinner, thereby disrupting the fiberizing process. Also, lowering the blower would result in glass primaries flying over the top of the blower, rather than being turned downward. Now, the blower can be lowered, thereby enabling great flexibility in designing the apparatus, and resulting in having the glass fibers intersect the blower jet in a region of higher blower jet velocity. This can be critical in some fine fiber processes because the small fibers have so little momentum that they are deflected by the induced air flow earlier than would be the case for fibers of standard diameters.

As shown in FIG. 2, the blower can be adapted with bottom airfoil 38 which continues the substantially continuous curved surface formed by the top airfoil and the inward face 40 of the blower. The substantially continuous curved surface is curved radially inwardly at the blower. The bottom airfoil defines a downwardly diverging passageway 42. This passageway will be annular if the blower is at the same level as the spinner, and will be circular if the blower is beneath the level of the spinner.

The blower of the invention can be used advantageously in two different ways. The blower can be used to increase the efficiency of attenuation in a fine fiber process. Alternatively, the blower of the invention with increased efficiency, can be used to more easily break fibers from a low energy process into shorter lengths. It has been found that the blower of this invention can be used to obtain a reduction in fiber length by 50 percent to 70 percent.

INDUSTRIAL APPLICABILITY

This invention will be found to be useful in the formation of fibers from molten glass for such uses as glass fiber thermal insulation products and glass fiber acoustical insulation products.

I claim:

1. Apparatus for producing mineral fibers comprising a spinner mounted for rotation to centrifuge mineral fibers from molten mineral material, an annular blower positioned concentrically outwardly from said spinner for turning the mineral fibers downward and inducing a downward flow of air around said spinner, the outlet of said blower being positioned at a level beneath said spinner, and an airfoil mounted above said blower to provide a downwardly converging annular passageway above the level of said blower for the induced air, said blower and said airfoil forming a substantially continuous curved surface, being curved radially inwardly at the blower.

2. The apparatus of claim 1 comprising a second airfoil mounted beneath said blower to provide a downwardly diverging passaeway below said spinner.

3. Apparatus for producing mineral fibers comprising a spinner mounted for rotation to centrifuge mineral fibers from molten mineral material, an annular blower positioned concentrically outwardly from said spinner for turning the mineral fibers downward and inducing a downward flow of air around said spinner, the outlet of said blower being positioned at a level beneath said spinner, a first airfoil mounted above said blower to provide a downwardly converging annular passageway above the level of said blower for the induced air, a second airfoil mounted below said blower for the blower gases, the induced air and the mineral fibers, said blower and said first and second airfoils forming a substantially continuous curved surface, being curved radially inwardly at the blower.

* * * * *